US008143846B2

(12) United States Patent
Herman et al.

(10) Patent No.: US 8,143,846 B2
(45) Date of Patent: Mar. 27, 2012

(54) SIDERAIL ACCESSORY CHARGING SYSTEM

(75) Inventors: Fred Herman, Gahanna, OH (US); Thomas F. Heil, Batesville, IN (US); Charles A. Howell, Batesville, IN (US); Michelle Kovach, Batesville, IN (US); Timothy Stanley, Indianapolis, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 21 days.

(21) Appl. No.: 12/757,272

(22) Filed: Apr. 9, 2010

(65) Prior Publication Data

US 2011/0248672 A1 Oct. 13, 2011

(51) Int. Cl.

| | |
|---|---|
| ***H02J 7/00*** | (2006.01) |
| *A47B 7/02* | (2006.01) |
| *A47C 31/00* | (2006.01) |
| *A47C 21/08* | (2006.01) |

(52) U.S. Cl. .......................................... 320/108; 5/618

(58) Field of Classification Search ...................... 5/618
See application file for complete search history.

(56) References Cited

U.S. PATENT DOCUMENTS

| | | | | |
|---|---|---|---|---|
| 6,185,767 | B1 | 2/2001 | Brooke et al. | |
| 6,658,680 | B2 * | 12/2003 | Osborne et al. | 5/600 |
| 6,781,517 | B2 | 8/2004 | Moster et al. | |
| 2007/0180616 | A1 * | 8/2007 | Newkirk et al. | 5/425 |
| 2008/0111522 | A1 * | 5/2008 | Simpson et al. | 320/162 |
| 2008/0172789 | A1 | 7/2008 | Elliot et al. | |
| 2008/0235872 | A1 | 10/2008 | Newkirk et al. | |
| 2009/0112630 | A1 * | 4/2009 | Collins et al. | 705/3 |

FOREIGN PATENT DOCUMENTS

| | | |
|---|---|---|
| WO | 9427544 | 12/1994 |

* cited by examiner

*Primary Examiner* — Patrick Assouad
*Assistant Examiner* — Steve T. Chung
(74) *Attorney, Agent, or Firm* — Jason Penninger

(57) ABSTRACT

A charging system comprises an accessory module and a charging system. The accessory module includes a housing with a coupling portion and a power source. The coupling portion includes an engagement surface and a coupler configured to removably couple the accessory module to a person-support apparatus. The power source is positioned within the housing and includes a recharging assembly. The charging station includes a docking portion configured to receive the accessory module and a charging assembly configured to communicate power to the recharging assembly.

25 Claims, 10 Drawing Sheets

SIDERAIL ACCESSORY CHARGING SYSTEM

BACKGROUND OF THE DISCLOSURE

This disclosure relates generally to charging systems. More particularly, but not exclusively, one illustrative embodiment relates to a charging system for an accessory module configured to removably couple to a person-support apparatus.

People staying in hospitals can often bring electronic devices, such as, a music and/or video player, a mobile phone, a video game device, etc. The devices can need to be recharged from time to time for their effective. While various person-support apparatuses have been developed, there is still room for development. Thus a need persists for further contributions in this area of technology.

SUMMARY OF THE DISCLOSURE

The present disclosure includes one or more of the features recited in the appended claims and/or the following features which, alone or in any combination, may comprise patentable subject matter.

In one illustrative embodiment, a charging system includes a contact thereon configured to engage a corresponding contact on an accessory module configured to be coupled to a person-support apparatus to recharge a power source in the accessory module. In another illustrative embodiment, a charging system includes a wireless power communication device configured to communicate power to an accessory module configured to be coupled to a person-support apparatus to recharge a power source in the accessory module. In another illustrative embodiment, the a kit includes a charging system and a front portion of an accessory module configured to communicate a data signal and/or a power signal to at least one of an external device and a person-support apparatus.

Additional features alone or in combination with any other feature(s), including those listed above and those listed in the claims and those described in detail below, can comprise patentable subject matter. Others will become apparent to those skilled in the art upon consideration of the following detailed description of illustrative embodiments exemplifying the best mode of carrying out the invention as presently perceived.

BRIEF DESCRIPTION OF THE DRAWINGS

Referring now to the illustrative examples in the drawings, wherein like numerals represent the same or similar elements throughout.

DETAILED DESCRIPTION OF THE DRAWINGS

Figure 1:
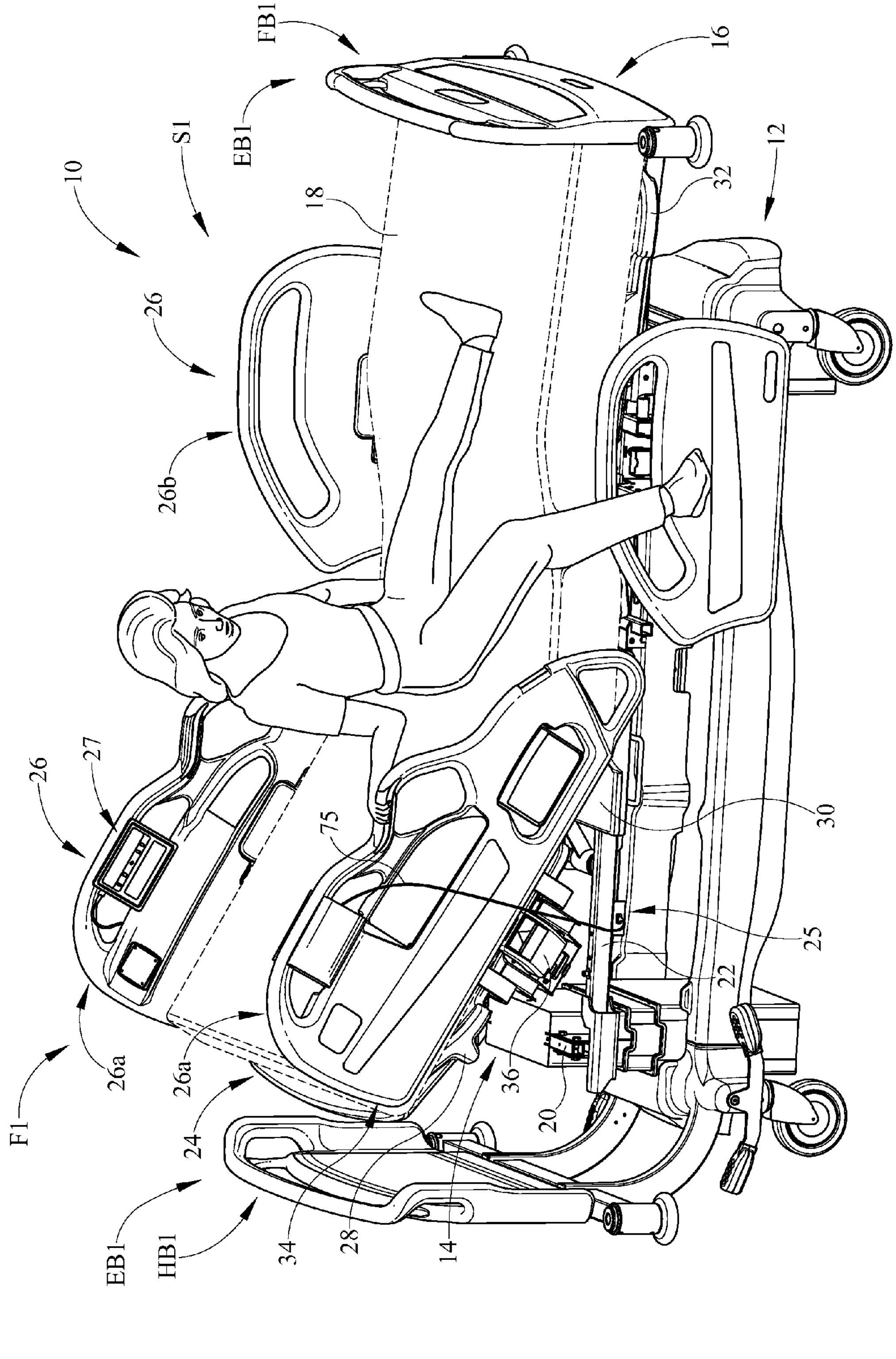
FIG. 1 is a perspective side view of a person-support apparatus with an accessory module coupled to a siderail according to one illustrative embodiment of the disclosure.

While the present disclosure can take many different forms, for the purpose of promoting an understanding of the principles of the disclosure, reference will now be made to the embodiments illustrated in the drawings, and specific language will be used to describe the same. No limitation of the scope of the disclosure is thereby intended. Various alterations, further modifications of the described embodiments, and any further applications of the principles of the disclosure, as described herein, are contemplated.

In one illustrative embodiment, a charging system includes a contact thereon configured to engage a corresponding contact on an accessory module configured to be coupled to a person-support apparatus to recharge a power source in the accessory module. In another illustrative embodiment, a charging system includes a wireless power communication device configured to communicate power to an accessory module configured to be coupled to a person-support apparatus to recharge a power source in the accessory module. In another illustrative embodiment, the a kit includes a charging system and a front portion of an accessory module configured to communicate a data signal and/or a power signal to at least one of an external device and a person-support apparatus.

A person-support apparatus 10 according to one illustrative embodiment of the current disclosure is shown in FIG. 1. The person-support apparatus 10 can have a first section F1 or head support section F1, where the head of a person can be positioned and a second section S1 or a foot support section S1, where the feet of the person can be positioned. In one illustrative embodiment, the person-support apparatus 10 can be a hospital bed. It should be appreciated that the person-support apparatus 10 can also be a hospital stretcher or an operating table.

The person-support apparatus 10 can include a lower frame 12 or base 12, a plurality of supports 14 coupled with the lower frame 12, an upper frame 16 supported on the supports 14 above the lower frame 12, and a control system (not shown) configured to control at least one function of the person-support apparatus 10. It should be appreciated that the supports 14 can be lift mechanisms 14 that can move the upper frame 16 with respect to the lower frame 12. It should also be appreciated that in one illustrative embodiment the person-support apparatus 10 can support a person-support surface 18 thereon.

The upper frame 16 can include an upper frame base 20, an intermediate frame 22, a deck 24, a data and/or power interface 25, siderails 26, and an accessory module 27 as shown in FIG. 1. It should be appreciated that the upper frame 16 can also include endboard EB1, such as, for example, a headboard HB1 and a footboard FB1, coupled to the first section F1 and the second section S1 of the person-support apparatus 10. The upper frame base 20 can be coupled to the supports 14 and can support the intermediate frame 22 and the deck 24 thereon as shown in FIG. 1. The deck 24 can be movably coupled to the intermediate frame 22 and can include a head portion 28, a seat portion 30, and a foot portion 32. The head portion 28, the seat portion 30, and the foot portion 32 can be movably coupled with each other and/or the intermediate frame 22.

The data and/or power interface 25 shown in FIG. 1 can be configured to transmit and/or receive a data signal and/or a power signal to/from a controller (not shown) and/or other device or system coupled thereto, such as, the accessory module 27. In one illustrative embodiment, the data and/or power interface 25 can be an RS-232 serial port and can be configured to output about 8 V DC. It should be appreciated that the data and/or power interface 25 can be a USB interface port, parallel port, or other interface configured to transmit and/or receive the data signal and/or the power signal. It should also be appreciated that the data and/or power interface 25 can have separate data and power connectors.

Figure 2:
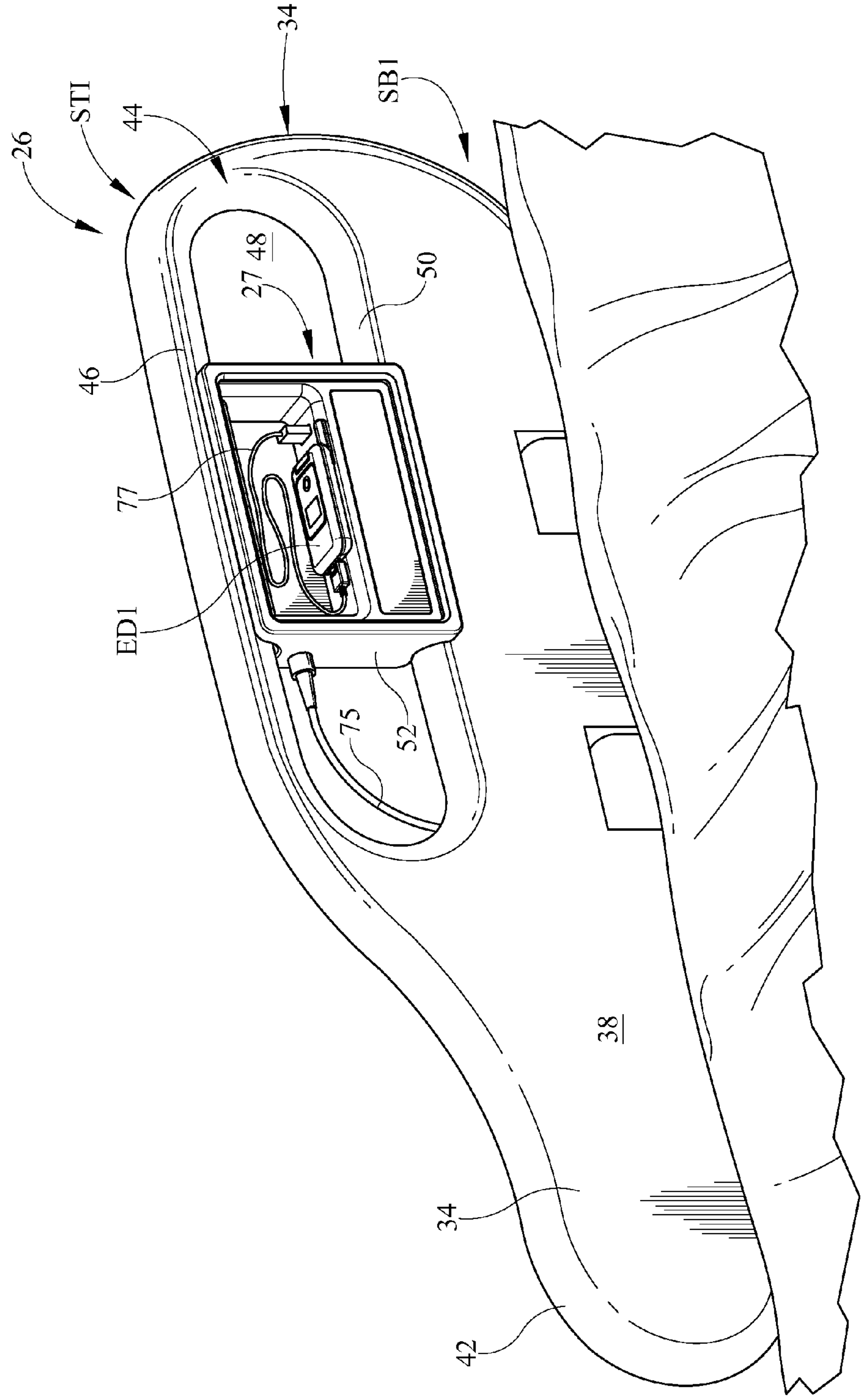
FIG. 2 is a perspective side view of the accessory module of FIG. 1 coupled to the siderail and positioned within a grip opening.

The siderails 26 can include a siderail body 34 with a top portion ST1 and a bottom portion SB1, and a siderail linkage 36 as shown in FIGS. 1 and 2. The siderail linkage 36 can be coupled to the bottom portion SB1 of the siderail body 34 and can couple the siderails 26 to the deck 24 and/or the intermediate frame 22. In one illustrative embodiment, the siderails 26 can be coupled to the head portion 28 of the deck 24 and/or intermediate frame 22 (i.e., a first siderail 26*a* or a head siderail 26*a*) and/or coupled to the foot portion 32 of the deck 24 and/or the intermediate frame 22 (i.e., a second siderail 26*b* or a foot siderail 26*b*) as shown in FIG. 1.

The siderail linkage 36 can be configured to facilitate movement of the siderails 26 between a deployed/operation position and a storage position as shown in FIG. 1. In the deployed/operation position, as shown in FIG. 1, at least a portion of the siderails 26 can be present above the upper frame 16. In the storage position, the siderails 26 can be moved to a lower position where at least a portion of the siderail 26 is below the deployed/operation position. It should be appreciated that the siderail linkage 36 can include a locking mechanism (not shown) that can maintain the siderails 26 in one of the operating and/or storage position when locked and can facilitate movement of the siderails 26 between the operating and storage position when unlocked.

The siderail body 34 can include a first surface 38, a second surface 40, a side surface 42 extending between the first surface 38 and the second surface 40 and a grip portion 44 as shown in FIG. 2. It should be appreciated that the siderail 26 can include a person interface (not shown) that can be in communication with the control system to selectably control various functionalities of the person-support apparatus 10. At least a portion of the first surface 38 and the second surface 40 can be substantially parallel to one another. The first surface 38 can be oriented such that the first surface 38 faces toward the upper frame 16 and the second surface 40 can be oriented such that the second surface 40 faces away from the upper frame 16.

The grip portion 44 shown in FIG. 2 can be configured to be gripped by a person to assist the person with ingress/egress to/from the person support apparatus 10. In one illustrative embodiment, the grip portion 44 can be located along the top portion ST1 and can include a grip 46 and a grip opening 48. The grip opening 48 can pass through the siderail body 34 and be configured to allow a person to wrap at least a portion of their fingers/hand around the grip 46. In one illustrative embodiment, an upper portion of the grip opening 48 can define the bottom of the grip 46 and a lower portion of the grip opening 48 opposite the upper portion of the grip opening 48 can define a portion of the upper side surface 50.

The accessory module 27 or a removable module 27 can be configured to be positionable within the grip opening 48 as shown in FIGS. 1-2. It should be appreciated that the accessory module 27 can be removably coupled to at least one endboard EB1. The accessory module 27 can be configured to transmit and/or receive a data signal and/or a power signal to/from an external device ED1 and/or the person-support apparatus 10. It should be appreciated that the accessory module 27 can transmit and/or receive a data signal and/or a power signal to/from a remote system (not shown) in communication with the accessory module 27, such as, a hospital network and/or a caregiver interface, such as, a nurse station, nurse call interface, remote device, an electronic medical device, or an electronic storage device. The external device ED1 can be at least one of a music and/or video player, such as, for example, an iPod, a mobile phone and/or smart phone, an electronic game device, an electronic personal organizer, or other personal electronic devices.

Figure 3:
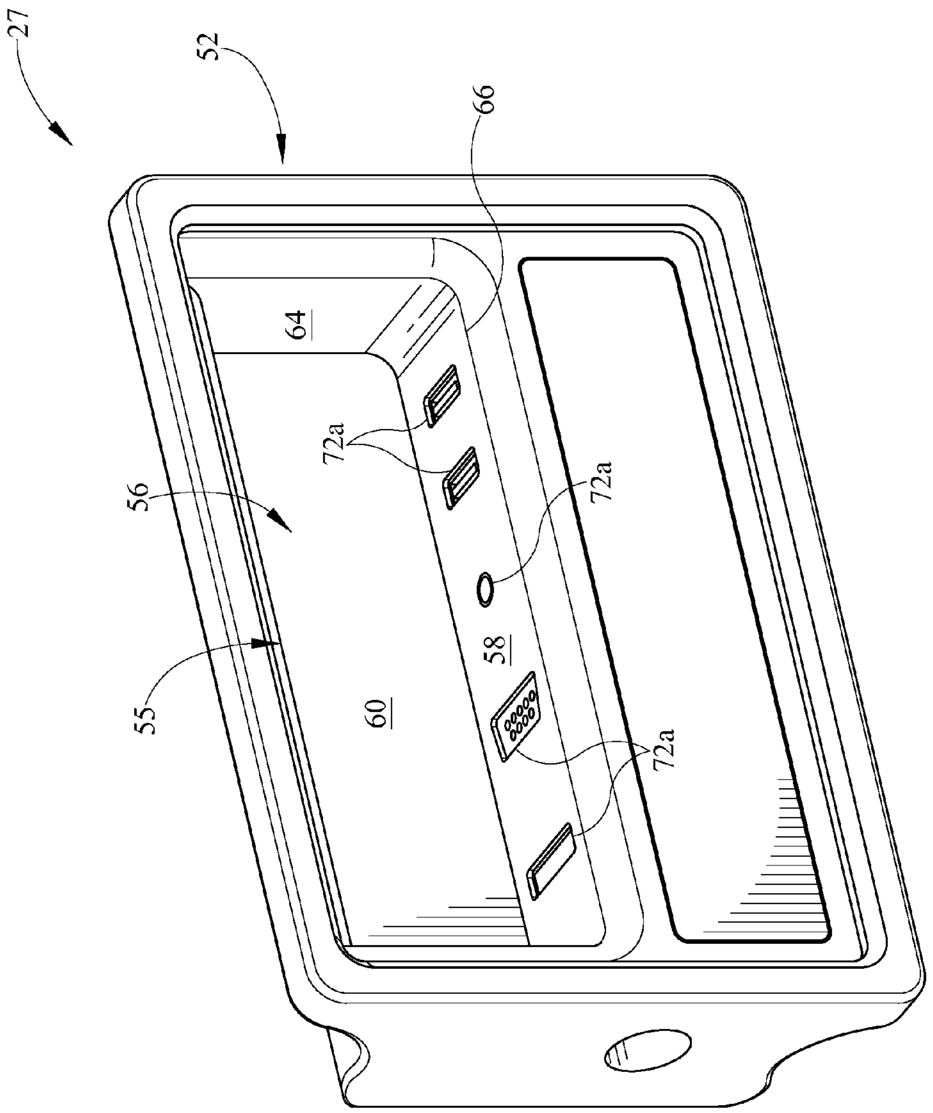
FIG. 3 is a perspective front view of the accessory module of FIG. 1 including a plurality of communication interfaces.
Figure 4:
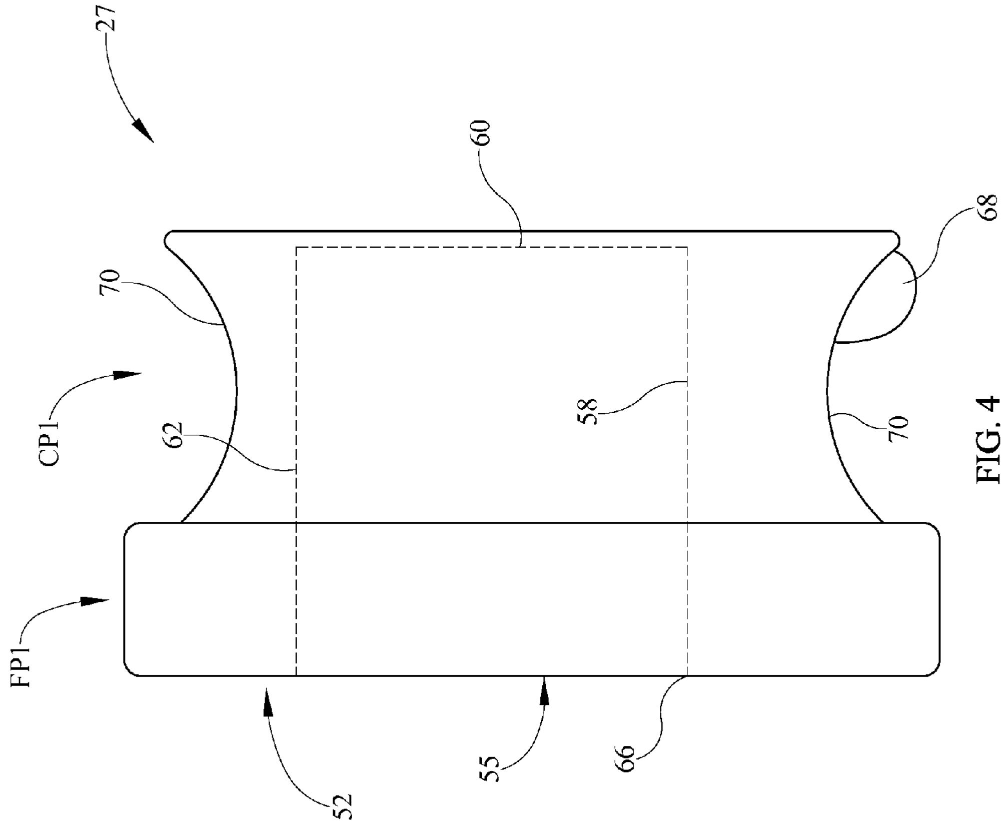
FIG. 4 is a side view of the accessory module of FIG. 1 showing a front portion and a coupling portion with a retainer and an engagement surface.
Figure 5:
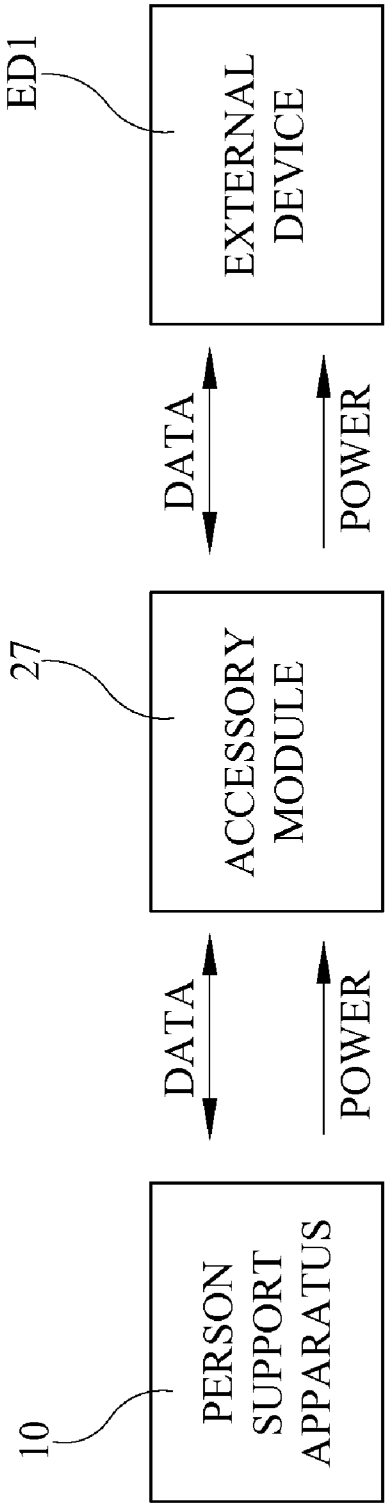
FIG. 5 is a diagrammatic view of the communication of data and/power signals between the person-support apparatus, accessory module, and external device according to one illustrative embodiment of the disclosure.

The accessory module 27 can include a housing 52 and a communication system 54 as shown in FIGS. 2-4 & 6-7. The housing 52 can be formed of a polymeric material and can be removably coupled to the person-support apparatus 10. The housing 52 can include a coupling portion CP1 and front portion FP1 as shown in FIG. 4. It should be appreciated that the housing 52 can also include a back portion (not shown) that can be removably coupled to the coupling portion such that the back portion cooperates with the front portion FP1 and the coupling portion CP1 to couple the accessory module 27 to the person-support apparatus 10. In one illustrative embodiment, the front portion FP1 can be removably couplable to the coupling portion CP1. It should be appreciated that the front portion FP1 can be part of a kit including multiple front portions FP1 configured to cooperate with the coupling portion CP1 to serve different purposes and/or perform different functions, such as, for example, storage, antimicrobial dispensing, tissue dispensing, cooling and/or heating, and/or other purposes and functions as shown in FIG. 8.

The housing 52 shown in FIGS. 2-4 & 6-7 can be configured to extend less than a predetermined distance beyond a plane extending along the first surface 38. It should be appreciated that the housing 52 can be configured to extend greater than or less than the predetermined distance when coupled to an endboard EB1 or other portion of the person-support apparatus 10. It should also be appreciated that the housing 52 can be configured to extend greater than the predetermined distance from the plane formed by the second surface 40. In one illustrative embodiment, the thickness of the siderail 26 with the accessory module 27 coupled thereto is less than about 3 inches. In another illustrative embodiment, the thickness of the coupling portion CP1 can be equal to about the thickness of the grip 46.

Figure 6:
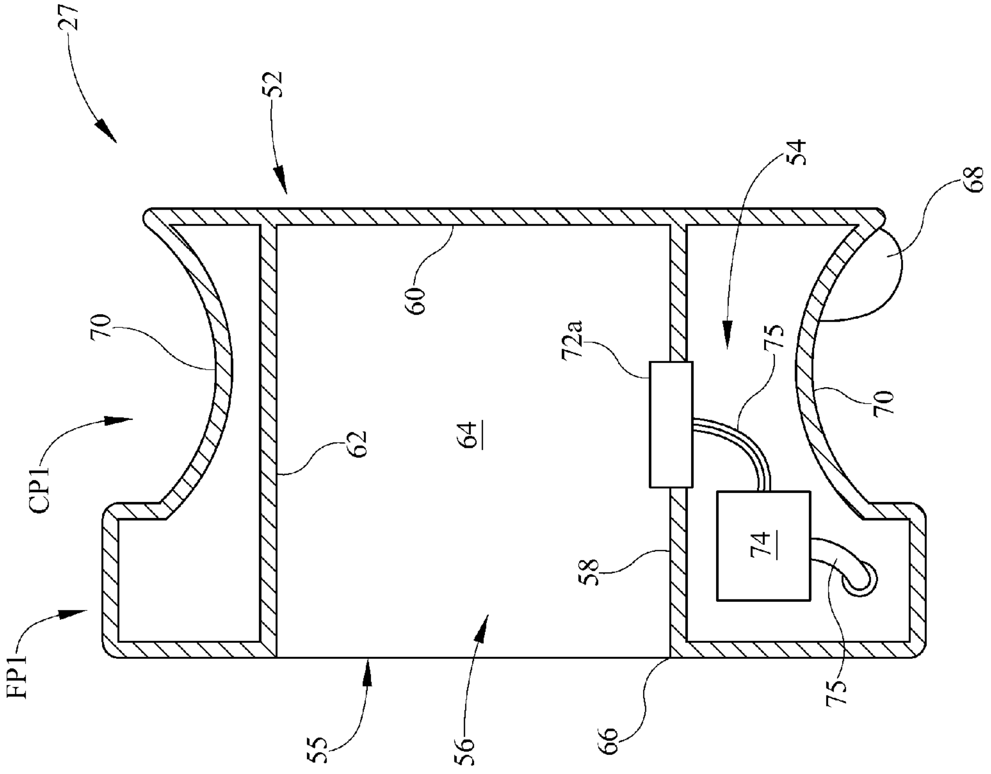
FIG. 6 is a side cross-sectional view of the accessory module according to one illustrative embodiment showing the communication system including a communication interface coupled to the bottom surface of the chamber and circuitry coupled to the communication interface via a cable.

The front portion FP1 of the housing 52 can include an opening 55 into a chamber 56 having a bottom surface 58, a rear surface 60, a top surface 62, and a plurality of side surfaces 64 shown in FIGS. 3-4 & 6. The side surface 64 can extend from about a front edge 66 of the bottom surface 58 to the rear surface 60, and from the bottom surface 58 to the top surface 62. The bottom surface 58 can be configured to support at least one external device ED1 thereon. It should be appreciated that the bottom surface 58 can be configured to removably retain the external device ED1 by way of a raised portion (not shown) along the front edge 66. It should also be appreciated that the external device ED1 can be retained on the bottom surface 58 with other fasteners or retainers (not shown). It should also be appreciated that the bottom surface 58 can be used for storage of both electronic devices and non-electronic devices.

The coupling portion CP1 can include a retainer 68 and engagement surfaces 70 as shown in FIGS. 4-7. In one illustrative embodiment, the retainer 68 can be a spring actuated mechanism that can be slidably or pivotably coupled to the housing 52 and movable relative to the housing 52 between extended and depressed or compressed positions. In another illustrative embodiment, the accessory module 27 can be configured to be press-fit or snapped into the grip opening 48. In still another embodiment, the retainer 68 can be a flexible tab (not shown) that can be deflected when inserting the housing 52 into the grip opening 48 and return to a substantially non-deflected state to provide a snap fit and couple the accessory module 27 within the grip opening 48. It should be appreciated that the accessory module 27 can be removed by pushing or pulling the accessory module 27 in the opposite direction from which it was press-fit or snapped in.

In yet another illustrative embodiment, the accessory module 27 can be configured to couple to at least one end board EB1. In still other embodiments, the accessory module 27 can be coupled to the siderails 26 and/or the end boards EB1 with hangers, hooks, clamps, fasteners (not shown), such as, screws, interlocking members, or other fastening elements. It should be appreciated that the accessory module 27 can be generally rectangular in shape. It should be further appreciated that the accessory module 27 can have antimicrobial properties.

Figure 7:
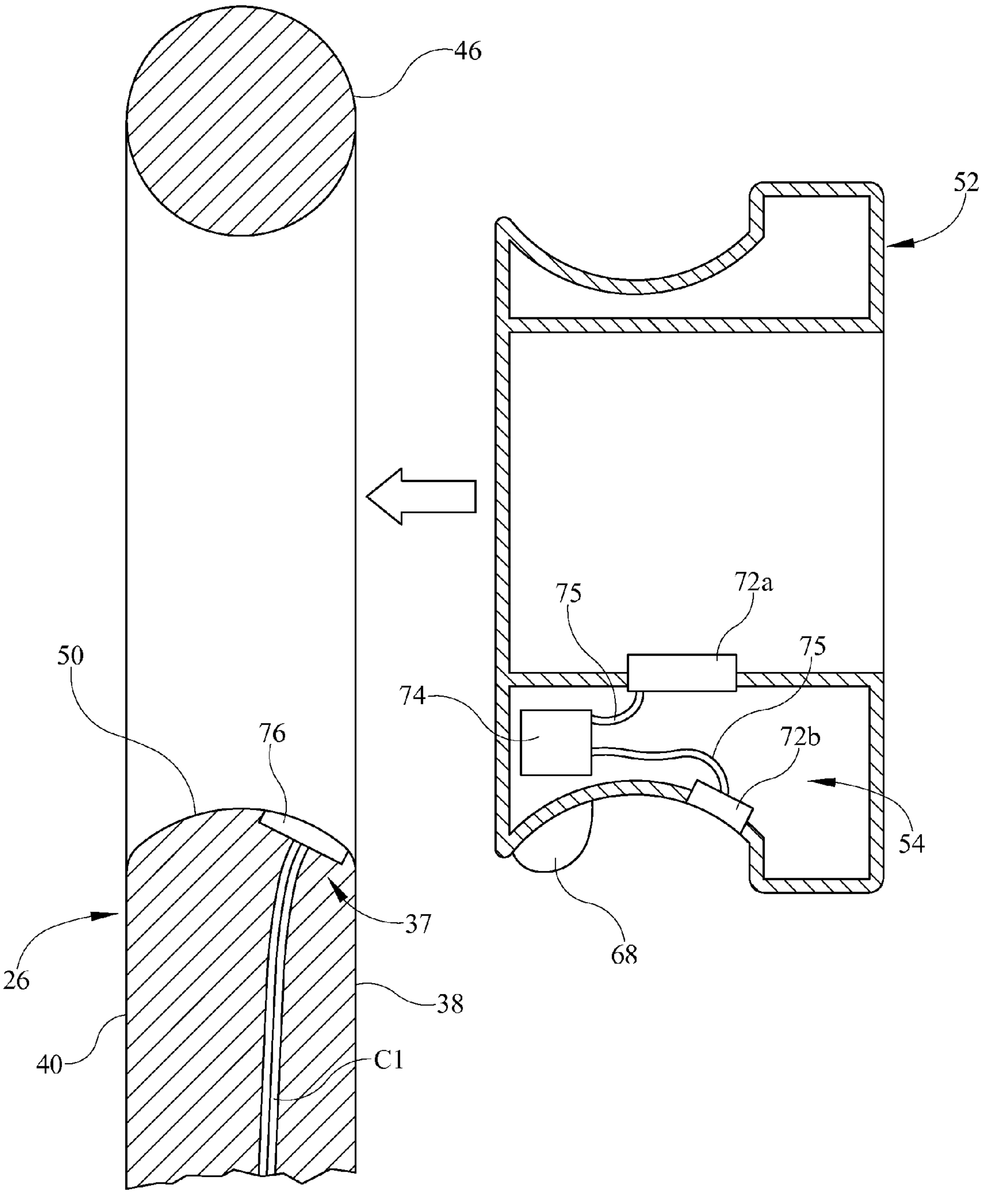
FIG. 7 is a side cross-sectional view of the accessory module according to one illustrative embodiment showing a first contact coupled to the engagement surface and a second contact coupled to the siderail and configured to engage the first contact.
Figure 8:
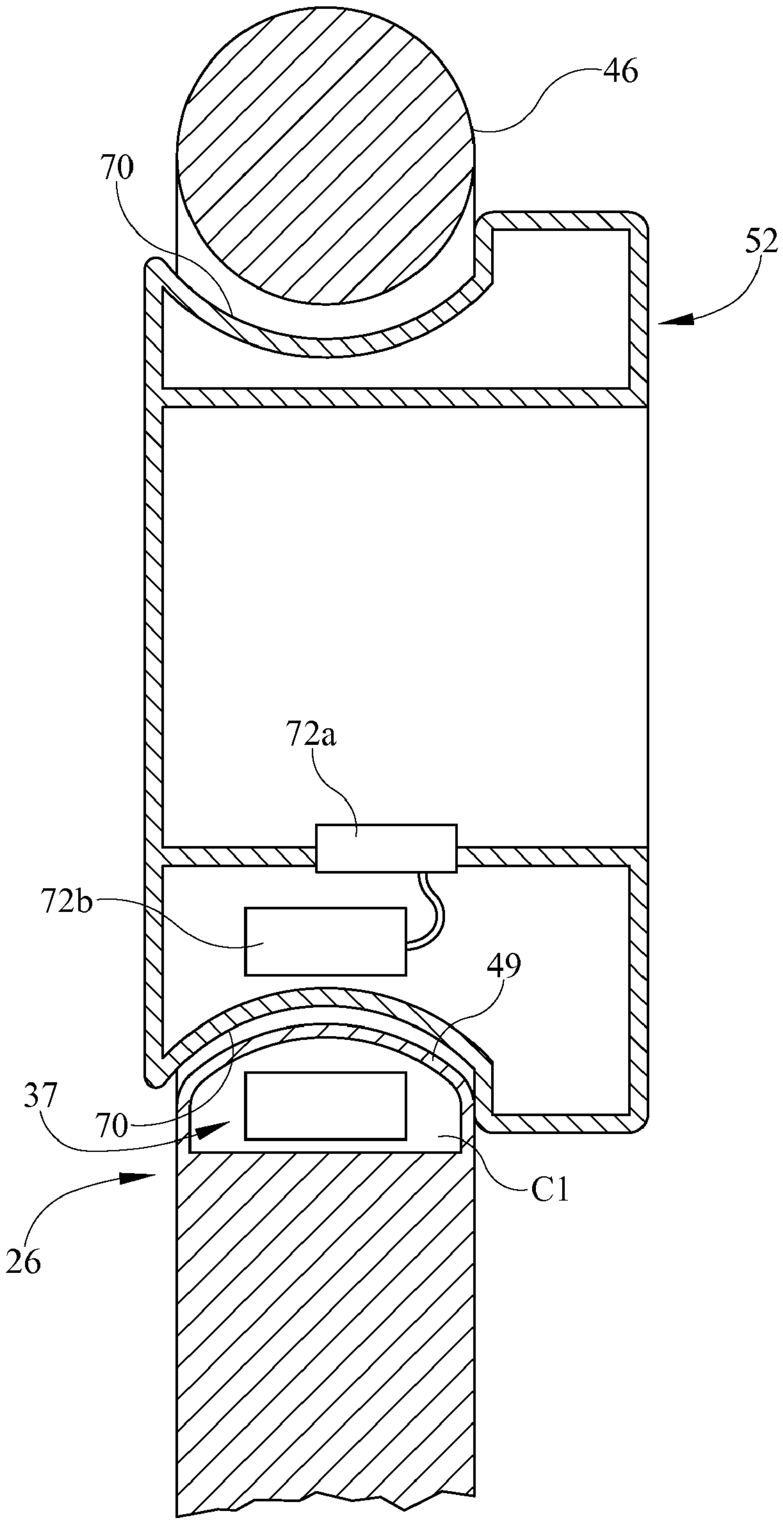
FIG. 8 is an exploded view of a kit including a plurality of different front portions configured to perform different function, a coupling portion, and a cable according to one illustrative embodiment of the disclosure.

The communication system 54 shown in FIGS. 6-7 can be configured to transmit and/or receive a data signal and/or a power signal to/from the external device ED1 and/or the person-support apparatus 10. The communication system 54 can include at a plurality of external device interfaces 72*a* and 72*b* and circuitry 74 positioned within the housing 51. It should be appreciated that the communication system 54 can include only one external device interface 72 configured to communicate with at least one external device ED1 and/or person-support apparatus 10. The communication system 54 can be configured to transmit and/or receive a data signal and/or a power signal to/from the external device ED1 and/or the person-support apparatus 10 through a wired connection and/or a wireless connection.

The circuitry 74 shown in FIGS. 6-7 can be electrically coupled to the external device interfaces 72*a* and 72*b* and can facilitate communication of data and/or power therebetween. In one illustrative embodiment, the circuitry 74 can include at least one cable 75 connecting the external device interfaces 72*a* and 72*b*. It should be appreciated that the cable 75 can connect the external device interface 72*a* directly to the data and/or power interface 25. In another illustrative embodiment, the circuitry 74 can include a controller (not shown) configured to control communication of data and/or power between the external device interfaces 72*a* and 72*b*, the external device ED1, and/or the person-support apparatus 10. In yet another illustrative embodiment, the circuitry 74 can be configured to regulate the voltage and/or current received from the person-support apparatus 10 such that the voltage and/or current transmitted to the external device ED1 is at a predetermined level, such as, for example, about 5 VDC. It should be appreciated that the predetermined level can be more or less than 5 VDC. In yet another illustrative embodiment, the circuitry 74 can include an analog to digital (A/D) and/or a digital to analog (D/A) converter. It should be appreciated that the circuitry 74 can include other digital and/or analog signal converters, shifters, encrypters and/or encoders, decrypters and/or decoders, or other digital and/or analog signal modifying hardware and/or software. In yet another illustrative embodiment, the circuitry 74 can include a wireless power transmitter and/or receiver (not shown) configured to transmit and/or receive power wirelessly to/from the external device and/or the person-support apparatus 10. It should be appreciated that the circuitry 74 can include an indicator light (not shown) configured to emit light when the accessory module 27 is transmitting and/or receiving a data signal and/or a power signal from at least one of the person-support apparatus 10 and external device ED1.

Figure 9:
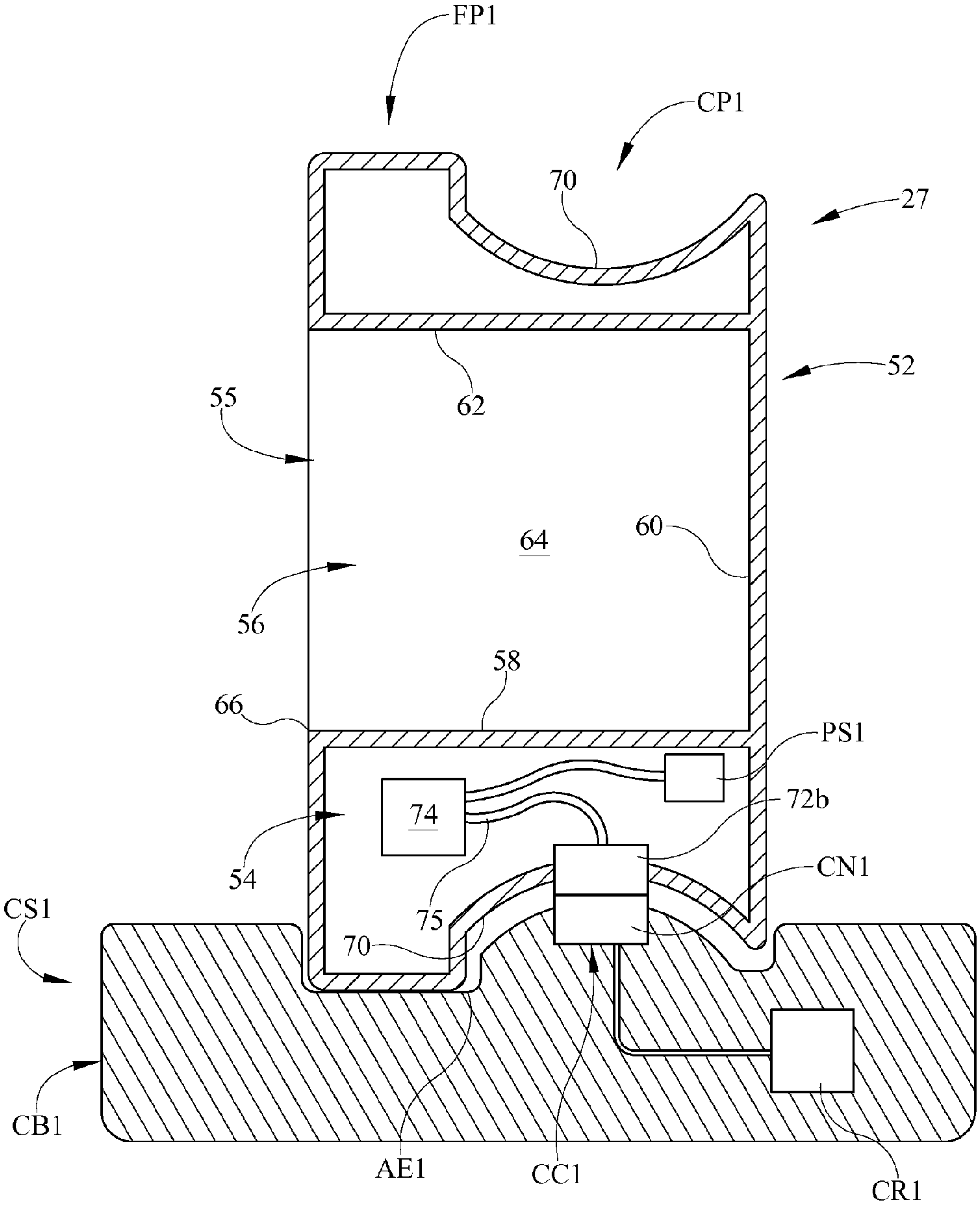
FIG. 9 is a side cross-sectional view of the accessory module of FIG. 1 engaging a portion of a charging station configured to recharge a power source within the accessory module.

In still another illustrative embodiment, the circuitry 74 can include a power source PS1, such as, for example, a battery PS1, configured to supply power to the external device ED1 and/or various components of the accessory module 27. It should be appreciated that the accessory module 27 can receive power from other sources, such as, for example, an inductive assembly positioned on/in a portion of the person-support apparatus 10, various healthcare equipment (not shown) in a room, a power outlet in a room, of other power sources. The battery PS1 can be rechargeable and the accessory module 27 can dock with a charging station CS1 to recharge the battery as shown in FIG. 9. It should be appreciated that the accessory module 27 and the charging station CS1 can be provided together in a kit with a cable configured connect the accessory module 27 to the charging station CS1. It should also be appreciated that a front portion FP1 can be provided with the charging station CS1. It should also be appreciated that multiple front portions FP1, at least one of which is configured to perform a function that differs from the function of at least one other front portion FP1, can be provided with the charging station CS1 in a kit.

The charging station CS1 can include a base CB1 with an accessory engaging surface AE1, a charging connector CC1, and charging circuitry CR1. The charging station CS1 can be connected to a power outlet (not shown) in a room. It should also be appreciated that the charging station CS1 can be connected to other power sources, such as, for example, a computer via a USB cable, the data and/or power interface 25 on the person-support apparatus 10, or other power sources. The accessory engaging surface AE1 can be configured to engage the engagement surface 70 of the accessory module 27 to support the accessory module 27 while the battery PS1 is being recharged. The charging circuitry CR1 can be configured to maintain about a predetermined voltage and/or current output level, such as, for example, about 5 V DC.

Figure 10:
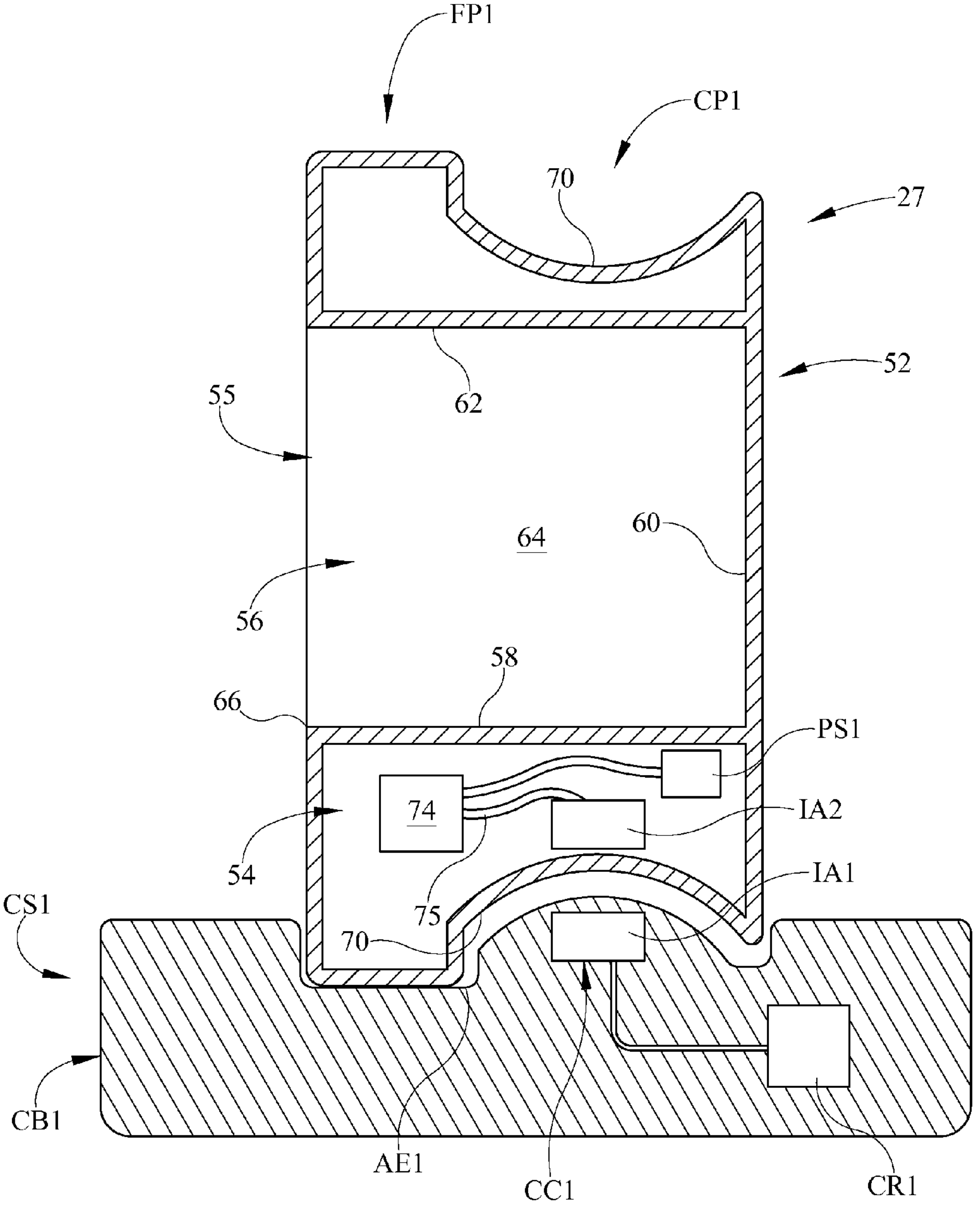
FIG. 10 is a side cross-sectional view of the accessory module of FIG. 1 engaging a portion of a charging station configured to wirelessly recharge a power source within the accessory module.

The charging connector CC1 can be configured to electrically couple with the external device interface 72 through a wired and/or wireless configuration. In one illustrative embodiment, the charging connector CC1 can be connected to the external device interface 72 via a cable (not shown). In another illustrative embodiment, the charging connector CC1 can be at least one contact CN1 configured to engage a corresponding contact 72*b* on the accessory module 27 as shown in FIG. 9. In still another illustrative embodiment, the charging connector CC1 can include an inductive arrangement IA1 configured to wirelessly communicate power to a corresponding inductive arrangement IA2 included in the circuitry 74 and positioned within the accessory module 27 as shown in FIG. 10.

The external device interfaces 72 shown in FIGS. 3 & 6-7 can be a wired and/or wireless device configured to transmit and/or receive a data signal and/or a power signal to/from the external device ED1 and/or person-support apparatus 10. In a wired configuration, the external device interfaces 72 can be physically connected to the external device ED1 and/or the person-support apparatus 10. In one illustrative embodiment, the external device interfaces 72 can be a plurality of contacts 76 configured to engage corresponding contacts on the external device ED1 and/or person-support apparatus 10 (as shown in FIG. 7). It should be appreciated that individual contacts can be configured to communicate one or both of data and power. In one example, the electrical contacts 76 can be positioned along the engagement surfaces 70 and at least one of the bottom of the grip 46 and the upper side surface 50 when the accessory module 27 is coupled to the siderail 26. In another example, the retainer 68 can include electrical contacts that can engage corresponding electrical contacts on at least one of the bottom of the grip 46 and the upper side surface 50 when the accessory module 27 is coupled to the siderail 26. It should be appreciated that the contacts 76 can be positioned anywhere on the front portion FP1 and/or the coupling portion CP1.

In another illustrative embodiment, the external device interface 72 can be a receptacle, such as, for example, a universal serial bus (USB) interface, located on the bottom surface 58 that can be configured to receive a first end of a cable 77, the second end of which can be configured to connect to the external device ED1 and/or the person-support apparatus 10 as shown in FIGS. 2-3 & 6-7. It should be appreciated that the cables 77 can be a group of cables supplied with the accessory module 27 in a kit with each cable 77 having a connector on the first end configured to couple to the external device interfaces 72, and at least one connector on the second end, which can be different than the connector on the first end, that can be configured to couple to different external devices ED1. It should also be appreciated that a kit can be provided including at least one cable 77, at least one front portion FP1, and/or a coupling portion CP1. It should also be appreciated that the external device interfaces 72 can be other sockets, plugs, and connectors, including, but not limited to, component video connectors, fiber optic connectors, cigarette lighter sockets, serial and/or parallel communication ports, or other electrical connections. It should also be appreciated that the external device interfaces 72 can be located on any surface of the housing 51. It should also be appreciated that the external device interfaces 72 can be configured to include separate power and data transmitting/receiving interfaces.

In a wireless configuration, the external device interfaces 72 shown in 3 & 6-7 can transmit and/or receive a data signal and/or a power signal to/from the external device ED1 and/or the person-support apparatus 10 regardless of whether the accessory module 27 is coupled to the person-support apparatus 10. In one illustrative embodiment, the external device interfaces 72 can be a Bluetooth wireless transceiver configured to transmit and/or receive data to/from the external device ED1, the person-support apparatus 10, and/or a remote system (not shown). It should be appreciated that the data signal and/or the power signal can be transmitted and/or received using other wireless techniques, such as, radio frequency (RF), infrared (IR), inductive coupling, or other forms of wireless data transmission/reception and/or near field/far field wireless power transmission techniques. It should also be appreciated that the remote system can be a hospital network, nurse call system, and/or other remote systems. In another illustrative embodiment, the external device interfaces 72 can be an inductive arrangement configured to charge a power source (not shown) in the external device ED1 while the external device is positioned on the bottom surface 58. It should be appreciated that the inductive arrangement can include a portion located within the housing 52 and a portion positioned on the person-support apparatus 10.

Many other embodiments of the present disclosure are also envisioned. For example, a charging system comprises an accessory module and a charging system. The accessory module includes a housing with a coupling portion and a power source. The coupling portion includes an engagement surface and a coupler configured to removably couple the accessory module to a person-support apparatus. The power source is positioned within the housing and includes a recharging assembly. The charging station includes a docking portion configured to receive the accessory module and a charging assembly configured to communicate power to the recharging assembly.

In another illustrative embodiment, a kit comprises an accessory module and a charging station. The accessory module includes a housing with a coupling portion and a power system. The coupling portion is configured to couple the accessory module to a person-support apparatus. The power system includes a power source positioned within the housing and a recharging assembly connected to the power source. The charging station includes a charging assembly configured to communicate power to the recharging assembly to recharge the power source.

In another illustrative embodiment, a kit comprises a power source, a front portion of an accessory module, and a charging station. The front portion is configured to removably couple to a rear portion of the accessory module housing. The front portion includes a power communication device electrically coupled to the power supply. The power communication device is configured to facilitate communication of power from the power supply to at least one of a person-support apparatus and a device in communication therewith. The charging station is configured to recharge the power source.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless can not be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles can have been presented, they need not be utilized in combination, and various combinations of inventive aspects and principles are possible in light of the various embodiments provided above.

What is claimed is:

1. A charging system, comprising:

an accessory module including a housing with a coupling portion and a power source, the coupling portion including an engagement surface and a coupler configured to removably couple the accessory module to a person-support apparatus, the power source being positioned within the housing and including a recharging assembly; and a charging station including a docking portion configured to receive the accessory module and a charging assembly configured to communicate power to the recharging assembly, wherein the charging station is not coupled to the person-support apparatus when the power source is being recharged.

2. The charging system of claim 1, wherein the charging assembly includes a first connector configured to engage a first end of a cable and the recharging assembly includes a second connector configured to engage a second end of the cable, the charging assembly being configured to communicate power to the recharging assembly via the cable.

3. The charging system of claim 1, wherein the charging station is configured to transmit power to the accessory module wirelessly.

4. The charging system of claim 1, wherein the charging assembly includes at least one contact configured to engage at least one corresponding contact on the accessory module to transmit power to the accessory module.

5. The charging system of claim 4, wherein the contacts on the accessory module are positioned on the engagement surface, a portion of the engagement surface being configured to engage a portion of the docking portion of the charging station.

6. The charging system of claim 5, wherein the contour of the engagement surface is configured to mimic the contour of the portion of the docking portion configured to receive the accessory module.

7. The charging system of claim 1, wherein the charging assembly is configured to inductively couple to the recharging assembly to transmit power to the accessory module.

8. The charging system of claim 1, wherein the accessory module is configured to couple to a siderail of the person-support apparatus.

9. The charging system of claim 8, wherein the siderail includes a body with a perimeter edge and a grip portion, the grip portion including an opening through the body that cooperates with the perimeter edge to define a grip, at least a portion of the accessory module being positionable within the opening when the accessory module is coupled to the siderail.

10. The charging system of claim 1, wherein at least one of the accessory module and the charging station have a light source positioned thereon, the light source being configured to emit a first color when the power source in the accessory module is being charged and emit a second light when the accessory module is not being charged.

11. The charging system of claim 1, wherein the accessory module is configured to at least one of transmit and receive at least one of a data signal and a power signal to a device in communication therewith.

12. A kit, comprising:

a power source;

a front portion of an accessory module configured to removably couple to a rear portion of the accessory module housing, the front portion including a power communication device electrically coupled to the power source, the power communication device being configured to facilitate communication of power from the power supply to a personal electronic device in communication therewith; and a charging station configured to recharge the power source.

13. The kit of claim 12 further comprising at least one rear portion of an accessory module configured to removably couple to the front portion.

14. The kit of claim 12, wherein the charging station is configured to recharge the power source wirelessly.

15. The kit of claim 12, wherein the charging station includes a charging system with an inductive coil configured to inductively couple with an inductive coil of a recharging system coupled to the power source to communicate power to the power recharging system and recharge the power source.

16. The kit of claim 12 further including a cable, the charging station being configured to recharge the power source via the cable.

17. The kit of claim 12, wherein the charging station includes at least one contact configured to engage a corresponding contact of a recharging system coupled to the power source to communicate power to the power recharging system and recharge the power source.

18. The kit of claim 12 further comprising a second front portion configured to at least one of retain an object at least partially within a space formed when the second front portion is coupled to a rear portion, dispense an antimicrobial substance, dispense a tissue, and generate a flow of air.

19. A charging system, comprising:

an accessory module including a housing including a coupling portion, a communication interface, and a power source, the coupling portion being configured to removably couple the accessory module to a person-support apparatus, the communication interface being configured to communicate at least one of data and power to a personal electronic device in communication therewith, the power source being positioned within the housing and including a recharging assembly, the power source being electrically coupled to the communication interface; and a charging station including a docking portion configured to receive the accessory module and a charging assembly configured to communicate power to the recharging assembly.

20. The charging system of claim 19, wherein the charging assembly is configured to be coupled to the recharging assembly via a cable.

21. The charging system of claim 19, wherein the charging station is configured to transmit power to the accessory module wirelessly.

22. The charging system of claim 19, wherein the charging assembly includes at least one contact configured to engage at least one corresponding contact on the accessory module to transmit power to the accessory module.

23. The charging system of claim 19, wherein the charging assembly is configured to inductively couple to the recharging assembly to transmit power to the accessory module.

24. The charging system of claim 19, wherein the accessory module is configured to couple to a siderail of the person-support apparatus.

25. The charging system of claim 19, wherein at least one of the accessory module and the charging station have a light source positioned thereon, the light source being configured to emit a first color when the power source in the accessory module is being charged and emit a second light when the accessory module is not being charged.

* * * * *